United States Patent
Dasgupta

(10) Patent No.: US 11,860,012 B2
(45) Date of Patent: Jan. 2, 2024

(54) ELECTROMAGNETIC FLOWMETER WITH ADJUSTABLE COIL AND SHIELD ASSEMBLY

(71) Applicant: ABB Schweiz AG, Baden (CH)

(72) Inventor: Subhashish Dasgupta, Bangalore (IN)

(73) Assignee: ABB Schweiz AG, Baden (CH)

( * ) Notice: Subject to any disclaimer, the term of this patent is extended or adjusted under 35 U.S.C. 154(b) by 269 days.

(21) Appl. No.: 17/289,639

(22) PCT Filed: Oct. 28, 2019

(86) PCT No.: PCT/IB2019/059213
§ 371 (c)(1),
(2) Date: Apr. 28, 2021

(87) PCT Pub. No.: WO2020/089765
PCT Pub. Date: May 7, 2020

(65) Prior Publication Data
US 2021/0396556 A1 Dec. 23, 2021

(30) Foreign Application Priority Data
Oct. 30, 2018 (IN) .............................. 201841040896

(51) Int. Cl.
*G01F 1/58* (2006.01)
*G01F 25/10* (2022.01)
*G01F 1/60* (2006.01)

(52) U.S. Cl.
CPC .............. *G01F 1/586* (2013.01); *G01F 1/588* (2013.01); *G01F 1/60* (2013.01); *G01F 25/10* (2022.01)

(58) Field of Classification Search
None
See application file for complete search history.

(56) References Cited

U.S. PATENT DOCUMENTS

| | | | | |
|---|---|---|---|---|
| 2,867,119 A | * | 1/1959 | Sturgeon | G01F 1/588 73/861.12 |
| 3,323,363 A | * | 6/1967 | Ketelsen | G01F 1/588 73/861.12 |

(Continued)

FOREIGN PATENT DOCUMENTS

| JP | H06174512 A | 6/1994 |
|---|---|---|
| JP | H09196724 A | 7/1997 |

(Continued)

OTHER PUBLICATIONS

European Patent Office, International Search Report for PCT/IB2019/059213, dated Feb. 14, 2020, 3 pages.

(Continued)

*Primary Examiner* — Harshad R Patel
(74) *Attorney, Agent, or Firm* — Leydig, Voit & Mayer, Ltd.

(57) ABSTRACT

The present invention relates to a an electromagnetic flowmeter for measuring flow of fluid flowing in a conduit of the electromagnetic flowmeter, wherein the electromagnetic flowmeter comprises: a coil attached to the conduit and excited by an excitation unit to generate an electromagnetic field to interact with the fluid flowing in the conduit, a shield magnetically coupled with the coil, a pair of electrodes mounted on the conduit for measuring potential difference generated by the interaction of the electromagnetic field in the fluid; and wherein the at least one coil and the at least one shield is provided with an arrangement to displace the at least one of the at least one coil and the at least one shield to adjust the interaction of the electromagnetic field with the fluid.

8 Claims, 4 Drawing Sheets

(56) References Cited

U.S. PATENT DOCUMENTS

| | | | | |
|---|---|---|---|---|
| 5,385,055 A | * | 1/1995 | Kubota | G01F 1/588 |
| | | | | 73/861.12 |
| 6,752,026 B1 | * | 6/2004 | Hyde | G01F 1/586 |
| | | | | 73/861.15 |
| 2015/0127275 A1 | | 5/2015 | Hies et al. | |

FOREIGN PATENT DOCUMENTS

| | | | | |
|---|---|---|---|---|
| JP | 3004135 B2 | * | 1/2000 | G01F 1/58 |
| WO | 1997041407 A1 | | 6/1997 | |
| WO | 2013164805 A1 | | 11/2013 | |
| WO | 2014051643 A1 | | 4/2014 | |
| WO | 2018109675 A1 | | 6/2018 | |

OTHER PUBLICATIONS

European Patent Office, Written Opinion for PCT/IB2019/059213, dated Feb. 14, 2020, 6 pages.
Indian Patent Office, First Examination Report for related IN 201841040896, dated Aug. 13, 2020, 5 pages.

\* cited by examiner

ELECTROMAGNETIC FLOWMETER WITH ADJUSTABLE COIL AND SHIELD ASSEMBLY

CROSS-REFERENCE TO RELATED APPLICATIONS

This application is a U.S. national stage of International Application Serial No. PCT/IB2019/059213, filed Oct. 28, 2019, which claims priority to Indian Patent Application No. 201841040896, filed Oct. 30, 2018. The entire disclosures of both of the foregoing applications are incorporated herein by reference.

FIELD OF THE INVENTION

The present invention relates generally to an electromagnetic flowmeter and more particularly to an electromagnetic flowmeter assembly with adjustable coil and shield assembly.

BACKGROUND OF THE INVENTION

Measurement of flow of fluids through a conduit or pipe can be done by numerous ways like using electromagnetic flowmeters.

A typical electromagnetic flowmeter works on Faraday's law of electromagnetic induction. An electromagnetic field is imposed within a flow pipe having a flow of fluid with a certain level of conductivity. Electromotive force (EMF) induced as a result of the interaction of the electromagnetic field with fluid molecules (ions in the fluid), is measured using electrodes provided at the pipe side walls. The measured EMF is proportional to the flowrate and thus used to measure flowrate. While electromagnetic flowmeters are attractive given that they are accurate and simplistic in construction, conditions of the site where the electromagnetic flowmeter is installed is also important in ensuring correct measurement of the flow rate of fluid flowing in the electromagnetic flowmeter.

An electromagnetic flowmeter may be installed at a site with different conditions of installation specific to the site. A condition like a bend, valve, reducer etc. in the pipe upstream of the flowmeter can cause a disturbance in the fluid flowing to the electromagnetic flowmeter. In other words upstream disturbances alter the calibration factor of the electromagnetic flowmeter, from the value obtained under standard laboratory conditions (during the calibration procedure). Downstream disturbances have little effect on the measurement values of the electromagnetic flowmeter, which however cannot be neglected.

The effect of upstream flow profile disturbances, on measurement accuracy have been encountered in electromagnetic flowmeters. A current practice to overcome this is to use a fluid flow straightener or an obstacle designed to modify flow and hence to induce flow profile uniformity. However, such features can cause pressure drop, have manufacturability issues and could suffer corrosion/erosion depending on fluid temperature and/or composition. Also, flow profile disturbances could be of several types due to several types of upstream disturbances (e.g. Disturbance due to a bend, disturbance due to a valve etc.). It is a challenge to design a universal flow conditioner for all such disturbances.

Currently, in order to mitigate adverse effect of bends and other upstream features on measurement accuracy several techniques are implemented. For example by using large electrodes to average out the effect of flow profile distortion. However, this calls for additional electrodes and other design complexities. Flowmeter pipes with non-circular cross section, have been known to perform better than circular cross section flowmeters. Reducing the cross-sectional area of flowmeters (also called reduced bore flowmeter) a currently existing design, is effective in lessening the effect of flow distortion. However, modification to pipe cross-sectional size and shape poses manufacturing and installation challenges and also cause pressure drop along the flow line.

Hence there is a need for an electromagnetic flowmeter assembly that provides measurement with a minimized effect of flow distortion due to upstream features.

SUMMARY

The above-mentioned shortcomings, disadvantages and problems are addressed herein which will be understood by reading and understanding the following specification.

In one aspect, the present invention An electromagnetic flowmeter for measuring flow of fluid flowing in a conduit of the electromagnetic flowmeter, wherein the electromagnetic flowmeter comprises: at least one coil attached to the conduit and excited by an excitation unit to generate an electromagnetic field to interact with the fluid flowing in the conduit; at least one shield magnetically coupled with the at least one coil; a pair of electrodes mounted on the conduit for measuring potential difference generated by the interaction of the electromagnetic field in the fluid; and wherein the at least one coil and the at least one shield is provided with an arrangement to displace the at least one of the at least one coil and the at least one shield to adjust the interaction of the electromagnetic field with the fluid.

In an embodiment, the at least one coil and the at least one shield is displaced with a screw mechanism.

In an embodiment, wherein the at least one coil and the at least one shield is displaced vertically with the screw mechanism to adjust the electromagnetic field in the conduit based on distortion of flow of the fluid in the conduit due to a bend upstream to the flow of the fluid.

In an embodiment, the screw mechanism is provided with graduation mark denoting distance of the electromagnetic flowmeter from a bend upstream to the flow of fluid.

In an embodiment, the at least one coil and the at least one shield is displaced vertically along the graduation mark denoting distance of the electromagnetic flowmeter from a bend upstream to the flow of the fluid.

In an embodiment, the at least one coil and the at least one shield is displaced along the graduation mark based on a relationship between the graduation mark and distortion in the velocity profile of the fluid.

BRIEF DESCRIPTION OF DRAWINGS

The appended drawings illustrate exemplary embodiments as disclosed herein, and are not to be considered limiting in scope. In the drawings.

DETAILED DESCRIPTION

The present invention is related to measurement of flow rate of a fluid flowing in a pipe by an electromagnetic flowmeter that is installed at a downstream position to a bend of the pipe. Usually, an electromagnetic flowmeter comprises a conduit layered with an inner lining/liner or an insulating pipe that carries the fluid, two electromagnetic coils one each, at the top and bottom of the insulating pipe or liner, a pair of electrodes inserted at the sides of the liner for measurement and a magnetic cover encloses all the elements which contains the generated magnetic field and ensures stronger fields for interaction with the fluid. When the coils are powered, an electromotive force (EMF) is induced within the fluid. By measuring this EMF using electrodes the flowrate is estimated. The EMF divided by velocity is the calibration factor of the given flowmeter. The calibration factor is obtained under ideal laboratory conditions with a straight length of pipe upstream of the flowmeter. However, distortion to flow profiles imposed by bends and other such upstream features in the field, can alter the calibration factor, affecting measurement accuracy. This distortion results in measurement inaccuracy, revealed by tests and modeling.

The present invention provides for minimizing the effect of flow distortion due to upstream features by modifying the magnetic field or flux distribution within the flowmeter. Currently flow modifying structures are implemented in electromagnetic flowmeters to minimize effect of flow distortion, such structures cause pressure drop. The varying angles and positions of installation of the electromagnetic flowmeter has an impact on the flow profile and a deviation from standard conditions can be expected resulting in erroneous measurements. The current invention caters to such dynamic conditions of installation and provides a correct measurement of the flow rate of the fluid under such conditions.

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be adapted. The following detailed description is, therefore, not to be taken in a limiting sense.

Figure 1:
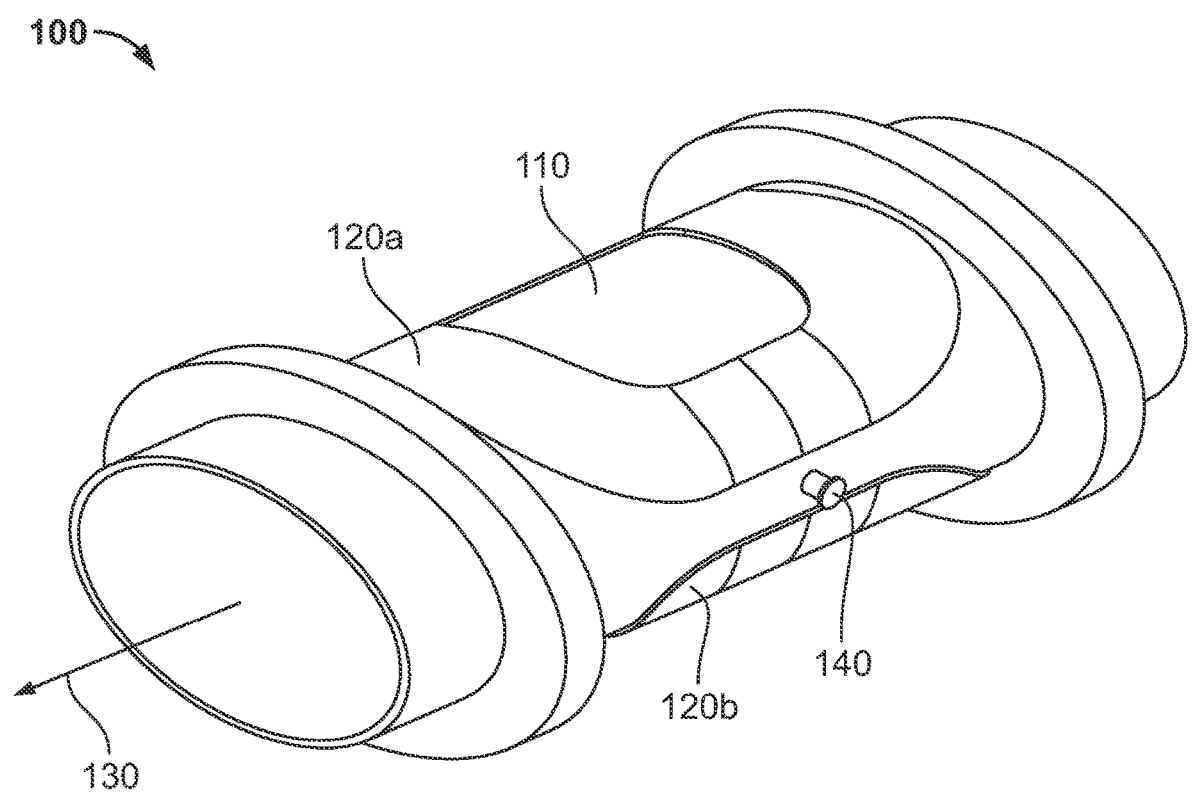
FIG. 1 shows a conduit of an electromagnetic flowmeter for measuring a flow of fluid in a flow pipe.

FIG. 1 shows a conduit for an electromagnetic flowmeter 100, which comprises a conduit/flow pipe 110 through which fluid flows, one or more coils 120 a, 120 b excited electrically by an excitation unit (not shown) for generating electromagnetic fields that interact with the fluid passing through the conduit/flow pipe, an electrode (140) of a pair of electrodes (shown in FIG. 1) and another electrode of the pair of electrodes is not visible in FIG. 1 but present at the opposite side of the conduit/flow pipe facing the electrode 140, The flowing fluid passes through the conduit 110 in the electromagnetic flowmeter. The one or more coils provided above the conduit 110, as shown in FIG. 100, are electrically excited, they generate an electromagnetic field that traverses the conduit 110 volume. As will be known to the persons skilled in the art, the coil can be of different shapes and number (in FIG. 1, two coils are shown) depending on the need for magnetic field intensity. Interaction of the magnetic flux and the moving fluid, causes a potential difference (Faraday's law of electromagnetic induction) to be measured by the electrodes 140 provided at the walls encompassing the cavity.

The present invention provides for improving accuracy in measurement for electromagnetic flowmeters installed in locations having an upstream disturbance by providing a means for adjusting the interaction of the electromagnetic field with the fluid. The coil of the electromagnetic flowmeter that is excited for generating electromagnetic field is provided with an arrangement for displacement of coils, for example using screws and thereby change the electromagnetic field interaction with the fluid.

Also, in existing electromagnetic flowmeters for concentrating the magnetic flux within the conduit usually a return iron (shield) is provided around the coils. In an embodiment, the present invention provides for a displaceable shield made of magnetic material. The shield is provided with screw mechanisms on either side to enable fine movements along the vertical direction to manipulate magnetic field distribution in the conduit. For a given distortion of velocity imposed by an upstream feature like a bend, the shield position can be adjusted to obtain a flux distribution which reduces the error below a permissible limit. Thus, an electromagnetic flowmeter can be provided with the options for manipulating electromagnetic field with displacing the coil and/or shield.

Figure 2:
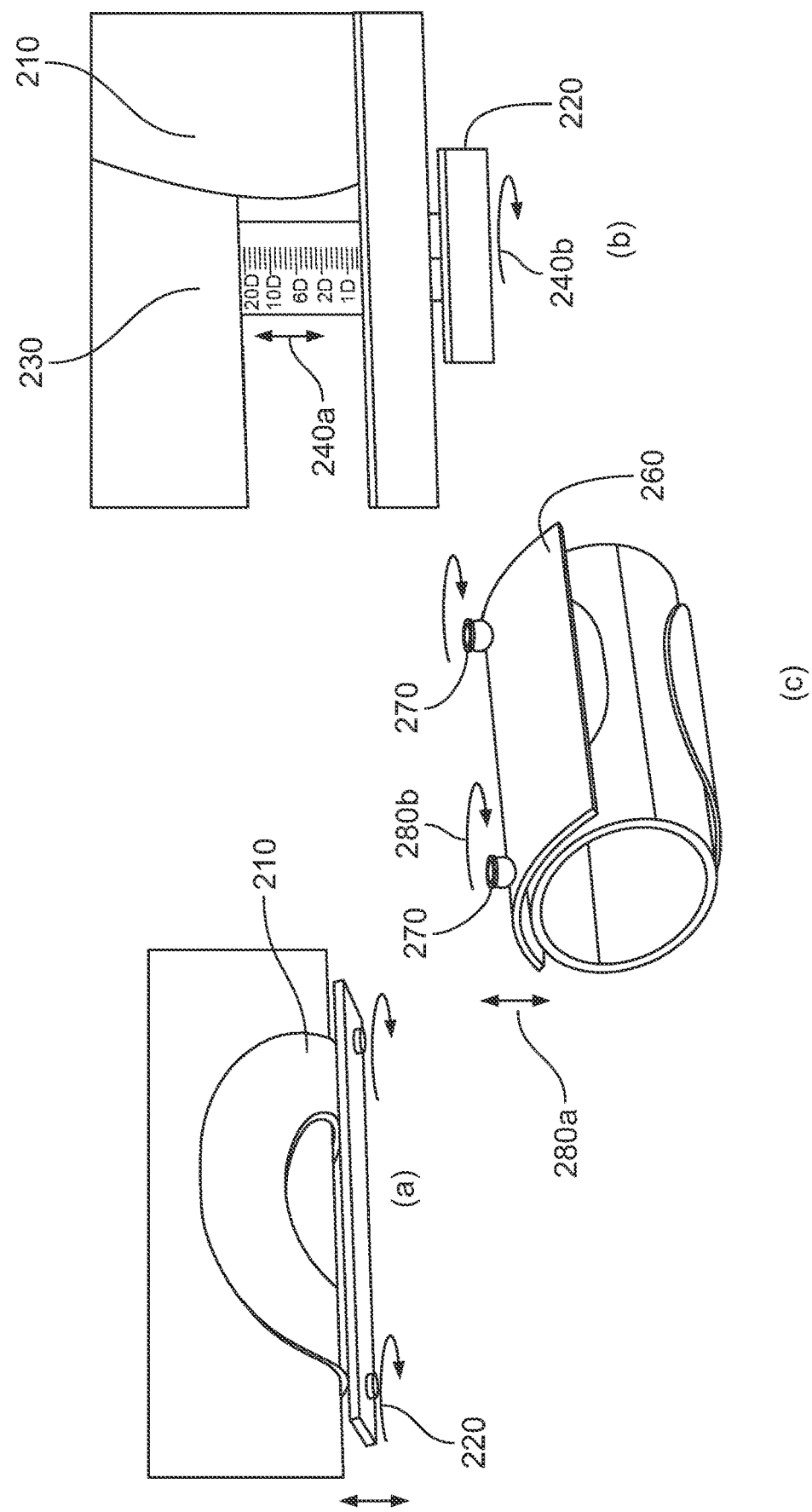
FIG. 2a shows a displaceable coil attached to a conduit of an electromagnetic flowmeter.
FIG. 2b shows a magnified view of the screw for displacing the coil.
FIG. 2c shows a displaceable shield attached with movable screws to the conduit of the electromagnetic flowmeter.

FIG. 2a shows a displaceable coil attached to the conduit of the electromagnetic flowmeter. In FIG. 2a a single coil is shown and the coil 210 is displaceable with a rotatable mechanism using screws 220. The coil is displaced by a distance depending on nearness to an upstream disturbance or intensity of flow distortion, where the closer the upstream disturbance the greater the distortion. This way magnetic field is modified in order to overcome error induced by an upstream bend or any other disturbance at a given distance from the electrometric flowmeter.

FIG. 2b shows a magnified view of the screw 220 for displacing the coil 210. FIG. 2b shows a graduated scale 230 provided along the screw 220. In an exemplary embodiment, the graduation is in terms of distance of the flowmeter from the upstream disturbance. For example if the disturbance is 2D (two times pipe diameter) upstream, the coil assembly should be displaced to the 2D graduation in the scale 230 shown in FIG. 2b. If the disturbance is 20D upstream, flow distortion is not severe, and the coil can be at the 20D position or the displaced position. The arrows 240a and 240b show the direction of movement of the screw for displacing the coil, where 240a shows linear motion and 240b shows rotational motion of the screw 220.

FIG. 2c shows a displaceable shield 260 attached with movable screws 270 to the conduit of the electromagnetic flowmeter. The arrows 280a and 28b show the direction of movement of the screw for displacing the shield, where 280a shows linear motion and 280b show the rotational motion of the screw. The displaceable shield 260 is made of a magnetic material.

The adjustment for varying electromagnetic field in the conduit can be made by rotating the screw 220 shown in FIG. 2a and screw 270 shown in FIG. 2c. The coil and the shield are displaced away from the conduit or closer to the conduit by rotating the screws to adjust the varying electromagnetic field in the conduit using the screws 220 and 270 based on distortion of flow of the fluid in the conduit due to a bend upstream to the flow of the fluid.

Figure 3:
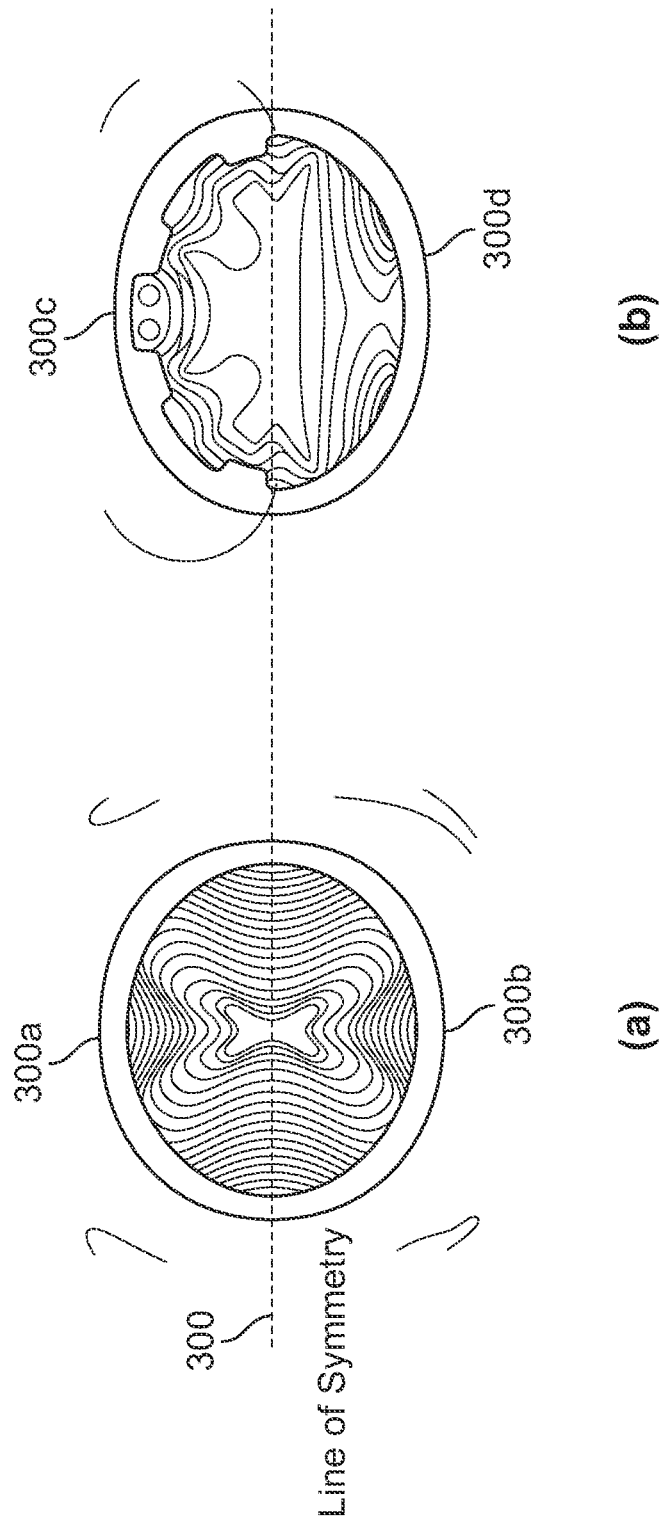
FIG. 3a shows a view of the bore of the electromagnetic flowmeter with uniform magnetic field.
FIG. 3b shows a view of the bore of the electromagnetic flowmeter with modified magnetic field.

FIG. 3a shows cross sectional view of the bore of the electromagnetic flowmeter indicating the magnetic field or flux distribution. The field distributions (300a, 300b) are symmetric about the line of symmetry 300 in FIG. 3a. FIG. 3b shows the cross sectional view of the bore of the electromagnetic flowmeter indicating the magnetic field or flux distribution that is modified or asymmetric about the line of symmetry (300c, 300d) due to the effect of varying electromagnetic field by displacing the coil, the shield or both the coil and the shield. The asymmetry is induced in order to overcome the effects of measurement inaccuracy resulting from distortion in flow of the fluid. This modification results in improved accuracy or significant reduction in error.

Figure 4:
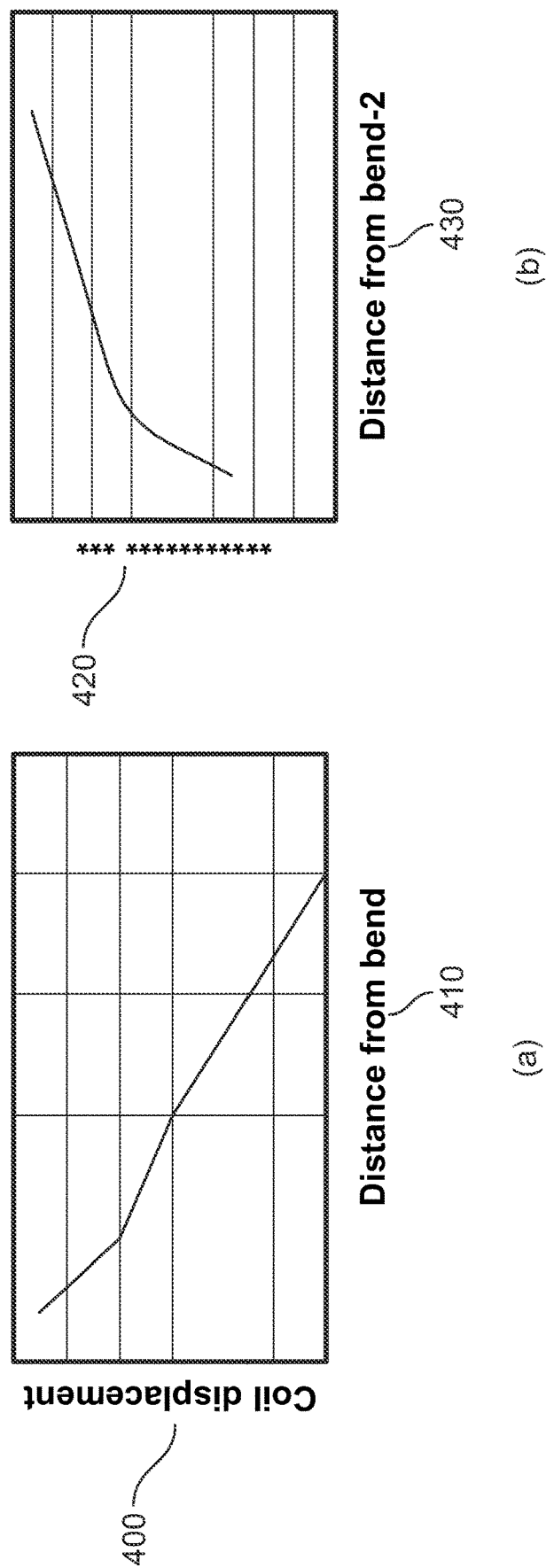
FIG. 4a shows a relationship between required displacement of coil and the distance of an upstream disturbance.
FIG. 4b shows a relationship between required displacement of shield and the distance of an upstream disturbance.

FIG. 4 shows an exemplary relationship between displacement of coil indicated by 400 and the distance of an upstream bend indicated by 410. Required displacement is more if the upstream disturbance is near the flowmeter causing severe flow distortion and vice versa. Mechanism to adjust electromagnetic field with screws can be provided to one or both the coils of the flowmeter. The relation shown in FIG. 4a, can be obtained by a Multiphysics model or digital twin of a given flowmeter and is used to guide coil displacement in response to an upstream condition. Such a "guide curve" is used for making the movement of the coil for modifying the magnetic field and obtain more accurate fluid flow rate measurements. Similarly, FIG. 4b shows a relationship between required displacement of shield 420 and the distance of an upstream bend indicated by 430. Using this relationship curve between distance of the flowmeter from the bend and displacement of the shield or coil, the magnetic field is adjusted to contain error below a permissible limit. The curves can be obtained from a validated scientific model of the flowmeter.

In an exemplary embodiment, both the coil and the shield can be displaced together to modify the magnetic field and counter the inaccuracy due to distortion in flow of fluid due an upstream disturbance. In such an arrangement wherein both the coil and the shield made of magnetic material are displaced to adjust the magnetic field, the screwing mechanism is provided to enable movement or displacement for both the coil and the shield together.

The flowmeter for exciting the coils for producing electromagnetic fields have a suitable power source and electronics circuitries for making potential difference measurements and display/transmitting the measured values. In an embodiment, the electromagnetic flowmeter can comprise a display for indicating the determined flow of fluid in the flow pipe. The 'guide curves' referred in FIG. 4 can be stored in the memory associated with the processor of the flowmeter and can be provided in the display (Human Machine Interface) of the flowmeter.

In an embodiment, the electromagnetic flowmeter is Internet of Things (IOT) enabled for providing remote controlling, better visibility of the working of the electromagnetic flowmeter, providing real time information to software systems and other surrounding IOT enabled systems including remote storing and remote analysis of electromagnetic flowmeter. Thereby having the above mentioned configurations for the electromagnetic flowmeter also enabled through remote support.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. An electromagnetic flowmeter for measuring flow of fluid flowing in a conduit of the electromagnetic flowmeter, wherein the electromagnetic flowmeter comprises:
   at least one coil attached to the conduit and excited by an excitation unit to generate an electromagnetic field to interact with the fluid flowing in the conduit;
   at least one shield magnetically coupled with the at least one coil; and
   a pair of electrodes mounted on the conduit for measuring potential difference generated by the interaction of the electromagnetic field in the fluid;
   wherein the at least one coil and the at least one shield is provided with an arrangement to displace the at least one coil and/or the at least one shield to adjust the interaction of the electromagnetic field with the fluid, and
   wherein the arrangement is affixed to the at least one shield, and the at least one coil is positioned between the conduit and the at least one shield.

2. An electromagnetic flowmeter as claimed in claim 1, wherein the arrangement comprises a screw mechanism, and the at least one coil and the at least one shield is displaced with the screw mechanism.

3. The electromagnetic flowmeter as claimed in claim 2, wherein the screw mechanism is provided with a plurality of graduation marks denoting distance of the electromagnetic flowmeter from a bend upstream to the flow of fluid.

4. An electromagnetic flowmeter as claimed in claim 1, wherein the at least one coil and the at least one shield are displaced vertically with a screw mechanism to adjust the electromagnetic field in the conduit based on distortion of flow of the fluid in the conduit due to a bend upstream to the flow of the fluid.

5. The electromagnetic flow/meter as claimed in claim 4, wherein the screw mechanism comprises a plurality of screws, and wherein at least two screws of the plurality of screws are aligned along an axis parallel to an axial axis of the conduit.

6. The electromagnetic flowmeter as claimed in claim 1, wherein the at least one coil and the at least one shield are displaced vertically along a plurality of graduation marks denoting distance of the electromagnetic flowmeter from a bend upstream to the flow of the fluid.

7. The electromagnetic flowmeter as claimed in claim 1, wherein the at least one coil and the at least one shield is displaced along a plurality of graduation marks based on a relationship between the plurality of graduation marks and distortion in the velocity profile of the fluid.

8. The electromagnetic flowmeter as claimed in claim 1, wherein the arrangement comprises a screw mechanism,
   wherein the screw mechanism comprises a plurality of graduation marks each corresponding to a distance from a disturbance in the electromagnetic field, the screw mechanism being configured to displace the at least one coil and/or the at least one shield are/is along a radial axis of the conduit, and wherein the screw mechanism abuts the conduit and adjusts a distance between the at least one shield and the conduit.

* * * * *